(12) United States Patent
Tsai

(10) Patent No.: US 8,407,854 B2
(45) Date of Patent: Apr. 2, 2013

(54) PROTECTIVE DEVICE FOR CASTOR

(76) Inventor: Po-Chuan Tsai, Tainan Hsien (TW)

( * ) Notice: Subject to any disclaimer, the term of this patent is extended or adjusted under 35 U.S.C. 154(b) by 319 days.

(21) Appl. No.: 12/897,855

(22) Filed: Oct. 5, 2010

(65) Prior Publication Data

US 2012/0079681 A1 Apr. 5, 2012

(51) Int. Cl.
*B60B 33/00* (2006.01)
(52) U.S. Cl. .......................... 16/18 CG; 16/45; 220/270
(58) Field of Classification Search ............... 16/18 CG, 16/18 R, 45; 220/270, 257.2; 215/254
See application file for complete search history.

(56) References Cited

U.S. PATENT DOCUMENTS

| | | | | |
|---|---|---|---|---|
| 4,696,394 A | * | 9/1987 | Estkowski et al. ............ | 206/303 |
| 4,793,022 A | * | 12/1988 | Raffaeli ............................ | 16/45 |
| 5,119,955 A | * | 6/1992 | Granofsky ...................... | 220/270 |
| 5,873,144 A | * | 2/1999 | Tupper et al. ............... | 16/18 CG |
| 5,996,833 A | * | 12/1999 | Lencioni et al. ............ | 220/257.2 |
| 6,290,084 B1 | * | 9/2001 | Louie ........................... | 220/254.4 |
| 6,854,616 B2 | * | 2/2005 | Steffan .......................... | 220/270 |
| 8,051,879 B2 | * | 11/2011 | Zeyfang ....................... | 138/96 T |

* cited by examiner

*Primary Examiner* — William L. Miller
(74) *Attorney, Agent, or Firm* — Alan Kamrath; Kamrath IP Lawfirm, P.A.

(57) ABSTRACT

A protective device for a castor includes a mounting ring, and a driving piece secured on the mounting ring. The mounting ring has an outer periphery formed with a breakable portion which is located beside the driving piece. The driving piece has a first end extending from the mounting ring and a second end formed with a pull tab. When the mounting ring is released by tearing the breakable portion, the mounting ring is directly driven by the driving piece to remove from each of the two rollers of the castor. Thus, the user only needs to apply a single action to pull the pull tab of the driving piece so as to remove the protective device from the castor completely so that the protective device can be removed from the castor easily and quickly.

12 Claims, 5 Drawing Sheets

PROTECTIVE DEVICE FOR CASTOR

BACKGROUND OF THE INVENTION

1. Field of the Invention

The present invention relates to a protective device and, more particularly, to a protective device for a castor.

2. Description of the Related Art

A conventional protective device 1 for a castor in accordance with the prior art shown in FIG. 1 comprises a C-shaped mounting sleeve 10 having an inner periphery formed with a plurality of catch plates 101, a pull member 11 having a first end attach to the mounting sleeve 10 and a second end formed with a pull tab 111, and two breakable lines 12 formed on the mounting sleeve 10 and extending to the first end of the pull member 11. In assembly, the protective device 1 is mounted on a castor. The castor includes a castor body and two rollers. When the mounting sleeve 10 of the protective device 1 is mounted on each of the two rollers of the castor, each of the two rollers of the castor is received in the mounting sleeve 10 and is retained by the catch plates 101. In such a manner, each of the two rollers of the castor is protected by the mounting sleeve 10 of the protective device 1 so that the protective device 1 can protect the castor to prevent the castor from being hit or worn during transportation. In operation, when the user applies a force on the pull tab 111 of the pull member 11, the pull tab 111 of the pull member 11 is pulled to tear the two breakable lines 12 so that pull member 11 is detached from the mounting sleeve 10, and the mounting sleeve 10 is broken and is released from each of the two rollers of the castor. Then, the user applies a force on the mounting sleeve 10 to remove the mounting sleeve 10 from each of the two rollers of the castor. However, the user has to apply a force on the pull tab 111 of the pull member 11 to break the mounting sleeve 10 and then has to apply a force on the mounting sleeve 10 to remove the mounting sleeve 10 from each of the two rollers of the castor, thereby wasting inconvenience to the user, and thereby wasting the user's time and energy.

BRIEF SUMMARY OF THE INVENTION

In accordance with the present invention, there is provided a protective device for a castor, comprising a mounting ring, a driving piece secured on the mounting ring, and a positioning plate secured on the mounting ring and detachably connected with the driving piece. The mounting ring has an outer periphery formed with a breakable portion which is located beside the driving piece. The driving piece has a first end extending from the mounting ring and a second end formed with a pull tab. The positioning plate has a first end extending from the mounting ring and a second end formed with a plurality of connecting blocks detachably connected with the pull tab of the driving piece.

According to the primary advantage of the present invention, when the mounting ring of the protective device is released by tearing the breakable portion, the mounting ring is directly driven by the driving piece to remove from each of the two rollers of the castor so that the mounting ring can be removed from each of the two rollers of the castor easily and quickly.

According to another advantage of the present invention, the user only needs to apply a single action to pull the pull tab of the driving piece so as to remove the protective device from the castor completely so that the protective device can be removed from the castor easily and quickly, thereby saving the working time and the user's energy.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
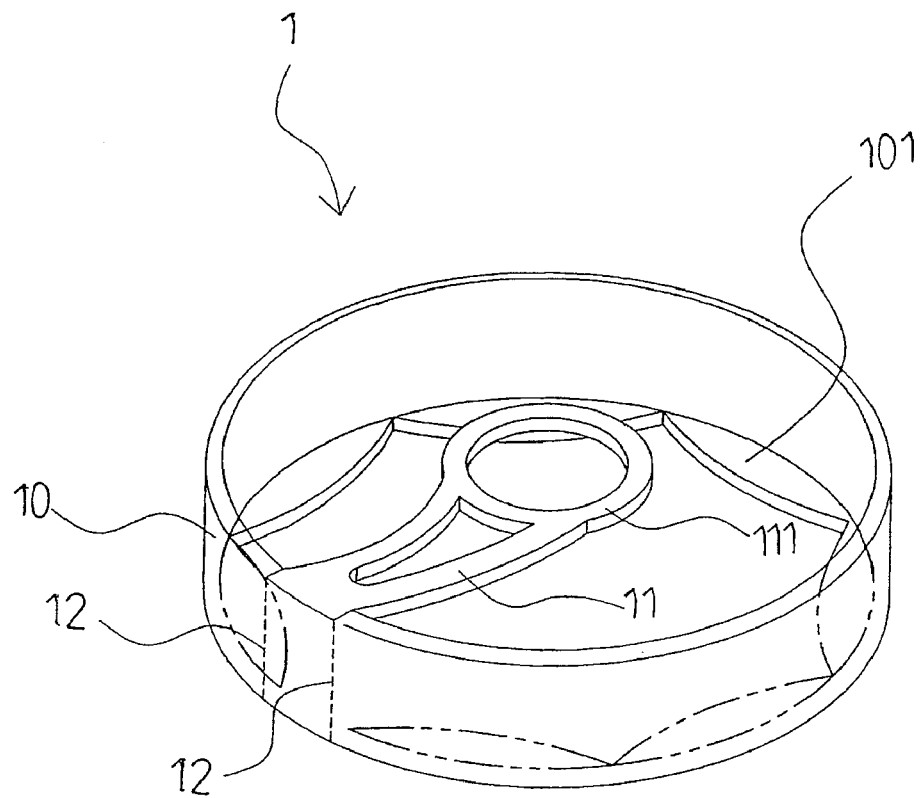
FIG. 1 is a perspective view of a conventional protective device for a castor in accordance with the prior art.
Figure 2:
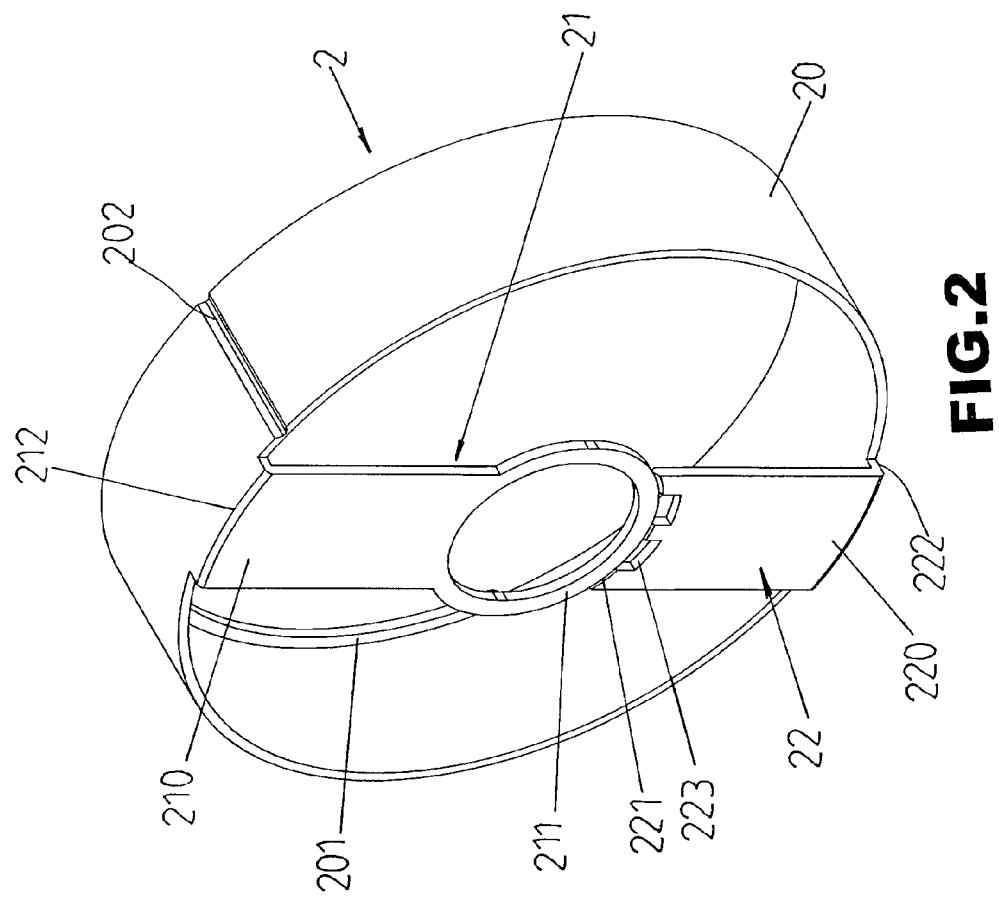
FIG. 2 is a perspective view of a protective device in accordance with the preferred embodiment of the present invention.

Referring to the drawings and initially to FIG. 2, a protective device 2 for a castor in accordance with the preferred embodiment of the present invention comprises a mounting ring 20, a driving piece 21 secured on the mounting ring 20, and a positioning plate 22 secured on the mounting ring 20 and detachably connected with the driving piece 21.

The mounting ring 20 has an inner periphery formed with a retaining flange 201. The mounting ring 20 has an outer periphery formed with a breakable portion 202 which is located beside the driving piece 21. The breakable portion 202 of the mounting ring 20 is spaced from and disconnected with the driving piece 21. Preferably, the breakable portion 202 of the mounting ring 20 is a notch extending through a whole width of the mounting ring 20.

The driving piece 21 is integrally formed with the mounting ring 20 and extends from the mounting ring 20 so that the driving piece 21 is fixed to and non-detachable from the mounting ring 20. The driving piece 21 has a first end 210 extending from the mounting ring 20 and a second end formed with a pull tab 211. The first end 210 of the driving piece 21 is formed with a connecting portion 212 connected with the mounting ring 20. The connecting portion 212 of the driving piece 21 has a substantially inverted L-shaped profile. The connecting portion 212 of the driving piece 21 has a first side connected with the breakable portion 202 of the mounting ring 20 so that the first side of the connecting portion 212 of the driving piece 21 is detachable from the mounting ring 20 through the breakable portion 202 of the mounting ring 20. The connecting portion 212 of the driving piece 21 has a second side fixedly combined with the mounting ring 20 so that the second side of the connecting portion 212 of the driving piece 21 is non-detachable from the mounting ring 20, and the driving piece 21 is combined with the mounting ring 20 without detachment.

The positioning plate 22 is integrally formed with the mounting ring 20 and extends from the mounting ring 20. The positioning plate 22 and the driving piece 21 traverse a side of the mounting ring 20. The positioning plate 22 has a first end 220 extending from the mounting ring 20 and a second end formed with a plurality of connecting blocks 221 detachably connected with the pull tab 211 of the driving piece 21. The first end 220 of the positioning plate 22 is formed with a connecting section 222 connected with the mounting ring 20. The connecting section 222 of the positioning plate 22 has a substantially L-shaped profile. The second end of the positioning plate 22 is formed with a plurality of recesses 223 arranged between the connecting blocks 221.

Figure 3:
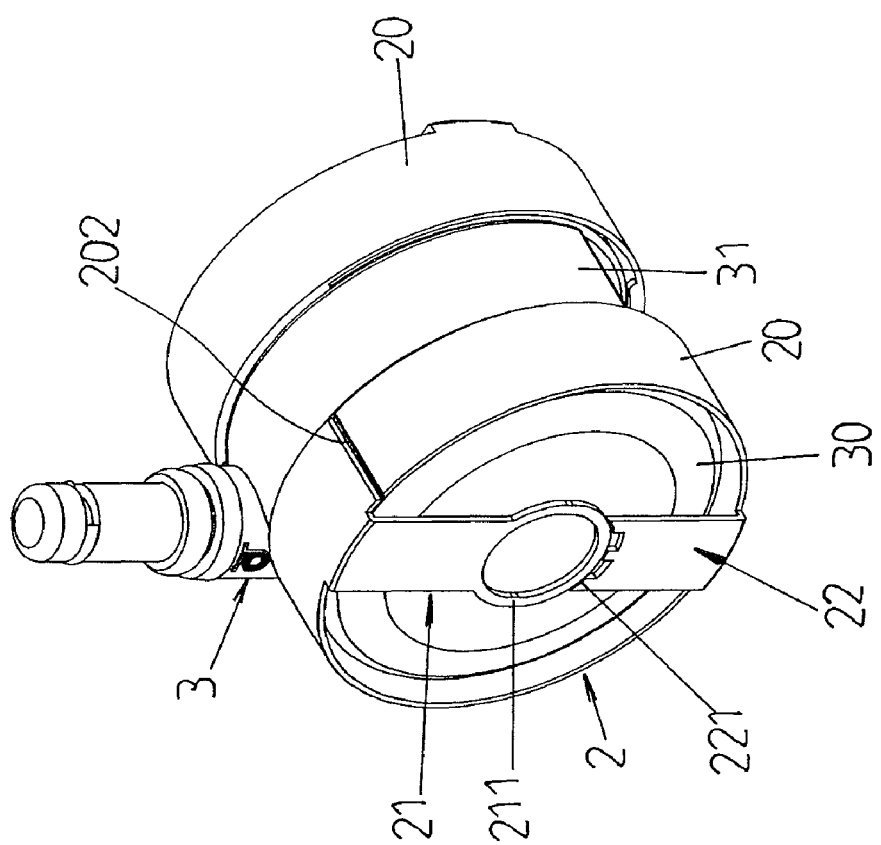
FIG. 3 is a perspective view of the protective device for a castor as shown in FIG. 2.
Figure 4:
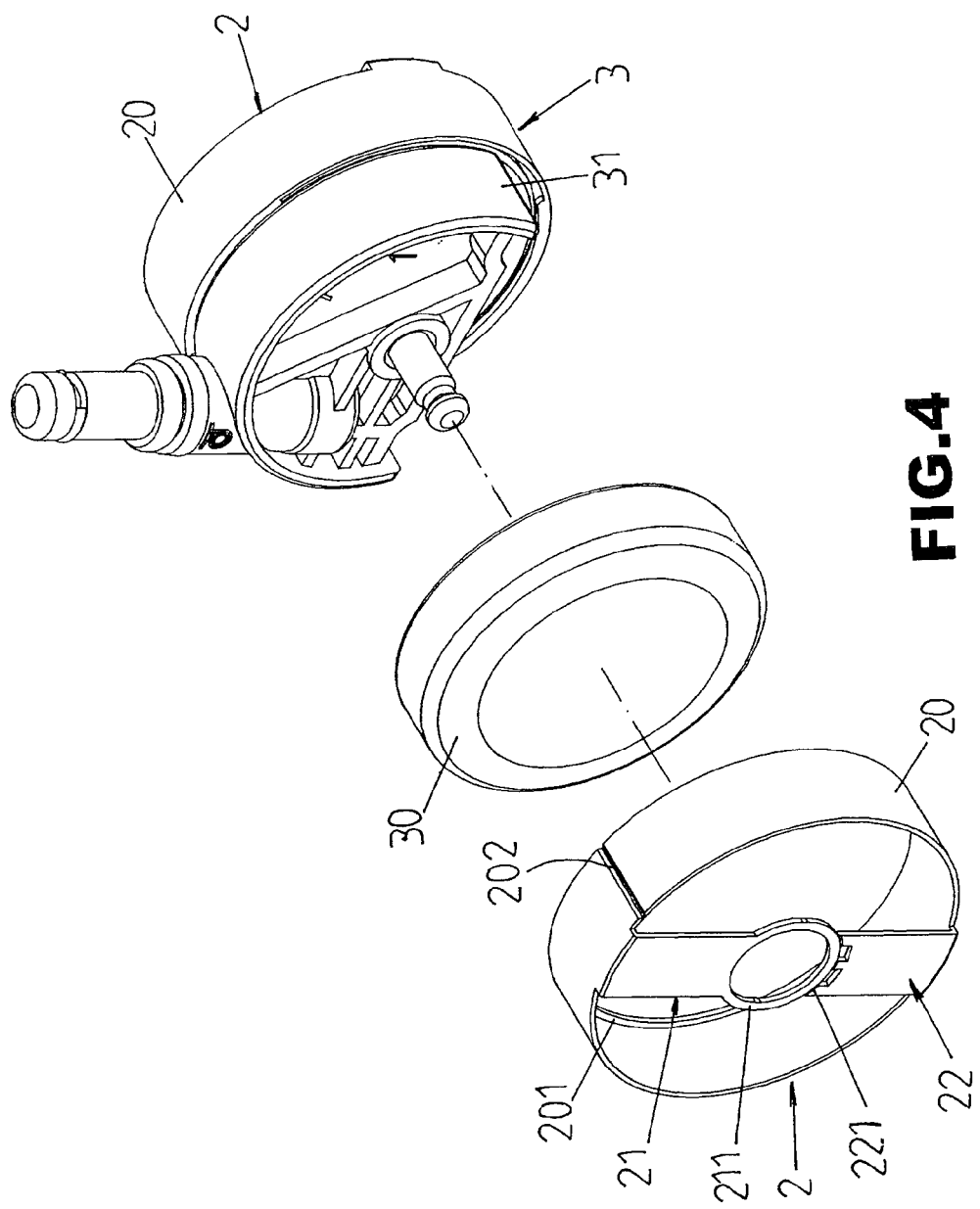
FIG. 4 is a partially exploded perspective view of the protective device for a castor as shown in FIG. 3.

In assembly, referring to FIGS. 3 and 4 with reference to FIG. 2, the protective device 2 is mounted on a castor 3. The castor 3 includes a castor body 31 and two rollers 30. When the mounting ring 20 of the protective device 2 is mounted on each of the two rollers 30 of the castor 3, each of the two rollers 30 of the castor 3 is received in the mounting ring 20 of the protective device 2 and is retained by the retaining flange 201 of the mounting ring 20. In such a manner, each of the two rollers 30 of the castor 3 is protected by the mounting ring 20 of the protective device 2 so that the protective device 2 can protect the castor 3 to prevent the castor 3 from being hit or worn during transportation.

Figure 5:
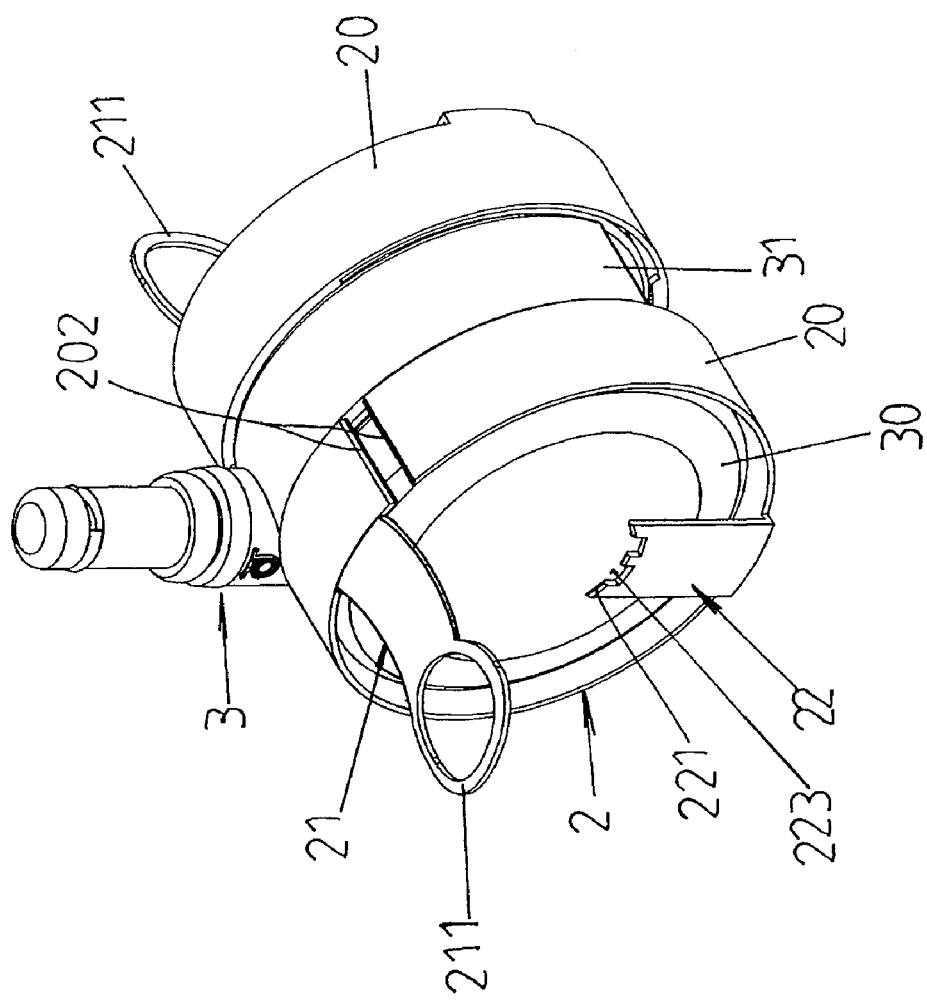
FIG. 5 is a schematic operational view of the protective device for a castor as shown in FIG. 3.

In operation, referring to FIG. 5 with reference to FIGS. 2-4, when the user applies a force on the pull tab 211 of the driving piece 21, the pull tab 211 of the driving piece 21 is detached from the connecting blocks 221 of the positioning plate 22. When the user further applies a pulling force on the pull tab 211 of the driving piece 21, the breakable portion 202 of the mounting ring 20 is torn to break the mounting ring 20 so that the mounting ring 20 is removable from each of the two rollers 30 of the castor 3. At this time, the driving piece 21 is still attached to the mounting ring 20 so that the mounting ring 20 is directly driven by the driving piece 21 to remove from each of the two rollers 30 of the castor 3. Thus, when the mounting ring 20 is torn from the breakable portion 202, the mounting ring 20 is directly driven by the driving piece 21 to remove from each of the two rollers 30 of the castor 3 so that the user only needs to pull the pull tab 211 of the driving piece 21 so as to remove the protective device 2 from the castor 3.

Accordingly, when the mounting ring 20 of the protective device 2 is released by tearing the breakable portion 202, the mounting ring 20 is directly driven by the driving piece 21 to remove from each of the two rollers 30 of the castor 3 so that the mounting ring 20 can be removed from each of the two rollers 30 of the castor 3 easily and quickly. In addition, the user only needs to apply a single action to pull the pull tab 211 of the driving piece 21 so as to remove the protective device 2 from the castor 3 completely so that the protective device 2 can be removed from the castor 3 easily and quickly, thereby saving the working time and the user's energy.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A protective device for a castor comprising:
a mounting ring for mounting to the castor;
a driving piece secured on the mounting ring; and
a positioning plate secured on the mounting ring and detachably connected with the driving piece, wherein:
the mounting ring has an outer periphery formed with a breakable portion located beside the driving piece;
the breakable portion allowing the mounting ring to be removed from the castor;
the driving piece has a first end extending from the mounting ring and a second end formed with a pull tab;
the positioning plate has a first end extending from the mounting ring and a second end formed with a plurality of connecting blocks detachably connected with the pull tab of the driving piece;
the first end of the driving piece is formed with a connecting portion connected with the mounting ring;
the connecting portion of the driving piece has a first side connected with the breakable portion of the mounting ring;
the first side of the connecting portion of the driving piece is detachable from the mounting ring through the breakable portion of the mounting ring;
the connecting portion of the driving piece has a second side fixedly combined with the mounting ring;
the second side of the connecting portion of the driving piece is non-detachable from the mounting ring; and
the driving piece is combined with the mounting ring without detachment.

2. The protective device for a castor of claim 1, wherein
the driving piece is integrally formed with the mounting ring and extends from the mounting ring; and
the driving piece is fixed to and non-detachable from the mounting ring.

3. The protective device for a castor of claim 1, wherein the connecting portion of the driving piece has a substantially inverted L-shaped profile.

4. The protective device for a castor of claim 1, wherein the positioning plate is integrally formed with the mounting ring and extends from the mounting ring.

5. The protective device for a castor of claim 1, wherein the positioning plate and the driving piece traverse a side of the mounting ring.

6. The protective device for a castor of claim 1, wherein the first end of the positioning plate is formed with a connecting section connected with the mounting ring.

7. The protective device for a castor of claim 6, wherein the connecting section of the positioning plate has a substantially L-shaped profile.

8. The protective device for a castor of claim 1, wherein the second end of the positioning plate is formed with a plurality of recesses arranged between the connecting blocks.

9. The protective device for a castor of claim 1, wherein the mounting ring has an inner periphery formed with a retaining flange.

10. The protective device for a castor of claim 1, wherein the breakable portion of the mounting ring is spaced from the driving piece.

11. The protective device for a castor of claim 1, wherein the breakable portion of the mounting ring is disconnected with the driving piece.

12. The protective device for a castor of claim 1, wherein the breakable portion of the mounting ring is a notch extending through a whole width of the mounting ring.

* * * * *